(12) United States Patent
Dussault et al.

(10) Patent No.: US 6,761,261 B2
(45) Date of Patent: *Jul. 13, 2004

(54) ARTICLE TRANSFER DEVICE

(75) Inventors: Jacques Dussault, Montchatel (CA); Guy Chabot, St-Nicolas (CA); Francois Potvin, Neuville (CA)

(73) Assignee: Maxi-Tour Inc. (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

This patent is subject to a terminal disclaimer.

(21) Appl. No.: 09/302,405

(22) Filed: Apr. 30, 1999

(65) Prior Publication Data

US 2002/0005335 A1 Jan. 17, 2002

Related U.S. Application Data

(60) Provisional application No. 60/131,142, filed on Apr. 27, 1999.

(51) Int. Cl.[7] .......................... B65G 25/00; B65G 47/26
(52) U.S. Cl. ..................................... 198/773; 198/774.3
(58) Field of Search ................................. 198/382, 773, 198/774.3, 736, 777; 110/281; 126/152 R, 175

(56) References Cited

U.S. PATENT DOCUMENTS

| | | | |
|---|---|---|---|
| 2,728,443 A | * 12/1955 | Pike, Jr. et al. ............. | 198/773 |
| 2,792,929 A | * 5/1957 | Magnuson et al. ......... | 198/773 |
| 2,818,967 A | 1/1958 | Bogle .......................... | 198/773 |
| 3,088,577 A | 5/1963 | Chamberlin ................ | 198/773 |

(List continued on next page.)

FOREIGN PATENT DOCUMENTS

| | | | | |
|---|---|---|---|---|
| CA | 1277682 | | 12/1990 | ........... B65G/25/04 |
| CA | 2046961 | | 5/1994 | ........... B07B/13/00 |
| CH | 663 404 A5 | | 12/1987 | |
| CH | 0663404 | * | 12/1987 | ................. 198/773 |
| DE | 29518 407 | | 2/1996 | ........... B65G/25/06 |
| FR | 2120000 | | 8/1972 | ........... B65G/47/00 |
| JP | 0262417 | * | 11/1986 | .............. 198/774.3 |
| JP | 0220210 | * | 9/1987 | .............. 198/774.3 |
| WO | WO 82/01179 | | 4/1982 | ........... B65G/25/08 |
| WO | WO 98/40293 | | 9/1998 | ........... B65G/47/14 |

Primary Examiner—Dean J. Kramer
Assistant Examiner—Paul T. Chin
(74) Attorney, Agent, or Firm—Katten Muchin Zavis Rosenman

(57) ABSTRACT

A device for transferring articles from between two spaced locations, the device has at least two groups of inclined platforms, each platform having an upper article-receiving surface and a leading edge region, wherein each article-receiving surface of the first group is overlapped by a platform of the second group. The device is being operable to reciprocate each of the first group of platforms relative to a corresponding second platform between two positions, wherein the leading edge region of each of the first group of platforms is aligned with a corresponding leading edge region of a platform of the second group.

19 Claims, 10 Drawing Sheets

U.S. PATENT DOCUMENTS

| | | | |
|---|---|---|---|
| 3,130,830 A | | 4/1964 | Allbeson .................. 198/774.1 |
| 3,168,190 A | | 2/1965 | Nienstedt ..................... 198/773 |
| 3,255,867 A | * | 6/1966 | Allen et al. .................. 198/773 |
| 3,265,195 A | | 8/1966 | Ford .......................... 198/773 |
| 3,291,173 A | | 12/1966 | Smith et al. .................... 99/636 |
| 3,413,938 A | * | 12/1968 | Dvirka ........................ 110/281 |
| 3,509,988 A | | 5/1970 | Smith .......................... 198/773 |
| 3,524,532 A | | 8/1970 | Hobbs ......................... 198/773 |
| 3,561,582 A | | 2/1971 | Smith .......................... 198/773 |
| 3,584,735 A | * | 6/1971 | Daugherty .................. 198/773 |
| 3,651,925 A | * | 3/1972 | Green ........................ 198/773 |
| 3,665,987 A | | 5/1972 | Daugherty .................. 198/733 |
| 3,700,116 A | | 10/1972 | Rysti ........................ 214/1 PB |
| 3,708,053 A | * | 1/1973 | Anderson .................... 198/445 |
| 3,768,626 A | | 10/1973 | Vossler et al. .............. 198/736 |
| 3,785,477 A | | 1/1974 | Kwasnitschka ............. 198/560 |
| 3,923,143 A | | 12/1975 | Green ........................ 198/773 |
| 3,985,084 A | * | 10/1976 | Delaplace .................... 110/281 |
| 4,069,909 A | * | 1/1978 | Altman et al. .............. 198/773 |
| 4,199,055 A | | 4/1980 | Green ......................... 198/773 |
| 4,215,966 A | | 8/1980 | Cooper ....................... 198/773 |
| 4,245,735 A | | 1/1981 | Valo ........................... 198/492 |
| 4,337,857 A | * | 7/1982 | Schneider ................... 198/773 |
| 4,512,280 A | | 4/1985 | Lee, Jr. ....................... 198/435 |
| 4,624,361 A | | 11/1986 | Hollins .................... 198/463.5 |
| 4,662,506 A | | 5/1987 | Tueckmantel ............ 198/463.5 |
| 4,685,552 A | | 8/1987 | Anderson et al. ........... 198/773 |
| 4,852,716 A | | 8/1989 | Roche ........................ 198/443 |
| 4,911,283 A | | 3/1990 | Hollins .................... 198/463.5 |
| 4,930,616 A | | 6/1990 | Lindberg .................. 198/463.6 |
| 5,011,024 A | | 4/1991 | Bunney ...................... 209/517 |
| 5,086,912 A | | 2/1992 | Howden, Jr. ............. 198/774.3 |
| 5,119,930 A | | 6/1992 | Stelter ..................... 198/463.5 |
| 5,174,351 A | | 12/1992 | Lindenblatt et al. ........ 144/356 |
| 5,257,688 A | | 11/1993 | Fridlund ..................... 198/443 |
| 5,351,729 A | | 10/1994 | Brisson ...................... 144/242 |
| 5,374,157 A | | 12/1994 | Allard ...................... 414/746.6 |
| 5,385,227 A | | 1/1995 | Marsh ........................ 198/773 |
| 5,423,417 A | * | 6/1995 | Redekop .................... 198/777 |
| 5,538,128 A | * | 7/1996 | Stierll et al. ................. 198/773 |
| 5,613,595 A | | 3/1997 | Ukada ..................... 198/774.3 |
| 5,647,472 A | * | 7/1997 | Fierkens ..................... 198/773 |
| 5,653,570 A | | 8/1997 | Weirathmueller ........ 414/746.6 |
| 5,673,636 A | * | 10/1997 | Stiefel ....................... 110/281 |
| 5,678,681 A | | 10/1997 | Klockars et al. ........... 198/773 |
| 5,871,080 A | * | 2/1999 | Manzi et al. ............... 198/396 |
| 5,938,002 A | * | 8/1999 | Molenarr et al. ........... 198/773 |
| 6,116,409 A | | 9/2000 | Yokajty et al. ............. 198/771 |

* cited by examiner

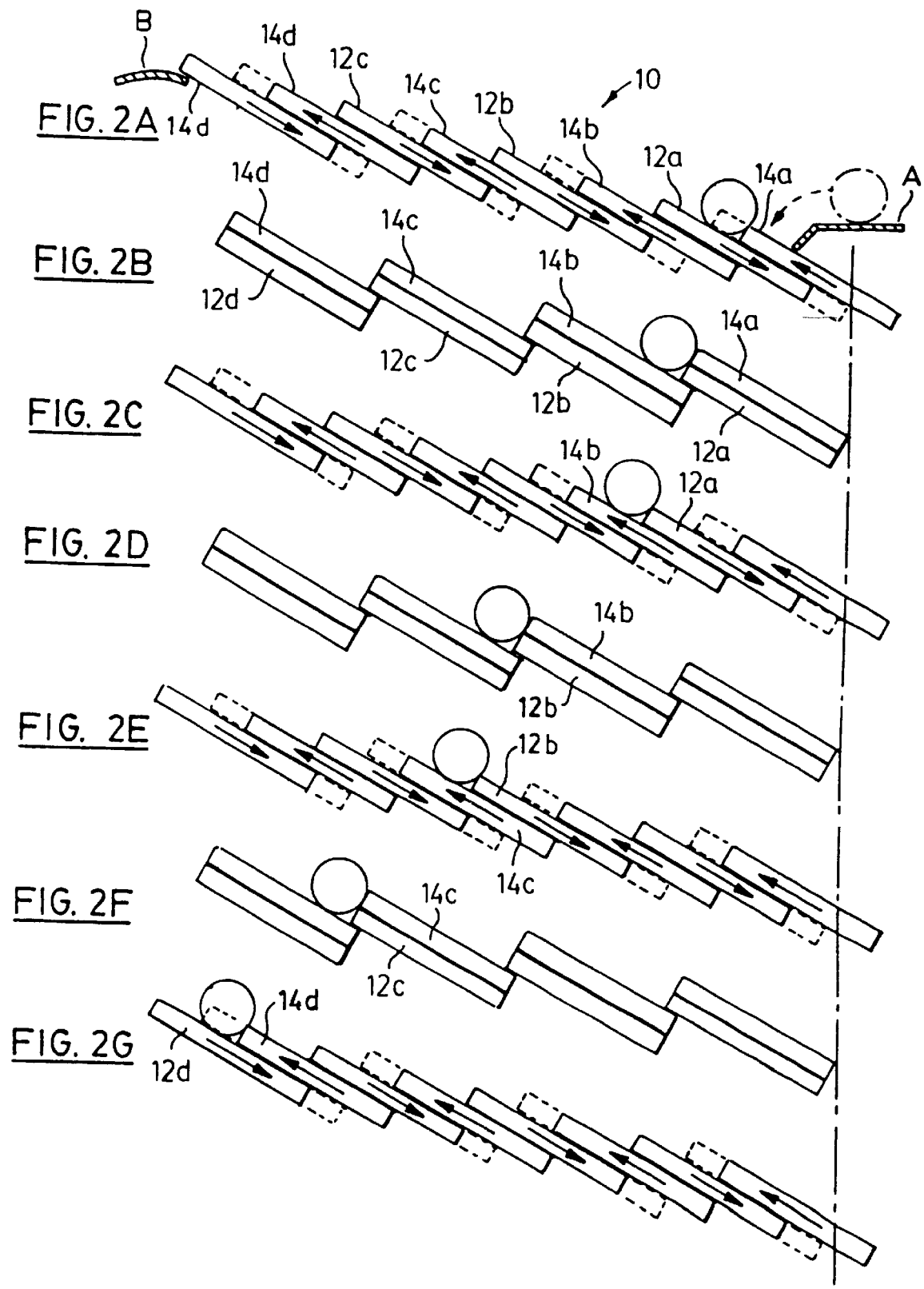

ARTICLE TRANSFER DEVICE

This application claims benefit of Prov. No. 60/131,142 filed Apr. 27, 1997. The subject matter of PCT Application serial No. PCT/CA98/00217 filed Mar. 13, 1998 is incorporated herein by reference.

BACKGROUND OF THE INVENTION

1. Field of the Invention

The present invention relates to the processing of articles.

2. Description of the Related Art

Automated log handling systems have been around for many years and have succeeded, at least in part, in reducing the labor component of the handling of logs while increasing the rate at which the logs are processed by a mill. There are several different versions of log handling devices, including linear versions which function to transfer the logs along a linear, usually upright, axis. One example is that known as a "step" feeder, which has a number of step members reciprocating side-by-side to transfer the logs from an entry point to an exit point, as the logs are moved from one step to the next. Another version is known as a 'quadrant' feeder and an example of this is disclosed in U.S. Pat. No. 5,119,930 to Stelter, which has a movable shelf which travels through an arc between generally an entry point near a 9 o'clock position to an exit point near a 12 o'clock" position.

Though satisfactory for their intended purpose, these machines have several disadvantages. Log bark, shavings and other log debris often accumulates relatively quickly on the moving parts requiring a partial plant shut down to clean. In addition, there can be wide variations in the thickness and shape of logs being delivered to the mill. One log might be thick and straight while the next one might be thin and bent, while the next one might be thick with knots. These conventional machines have had mixed success at handling these wide variations in the types of logs and at controlling the buildup of wood debris.

It is an object of the present invention to provide an improved article transfer device.

SUMMARY OF THE INVENTION

Briefly stated, the present invention involves a device for transferring articles from between two spaced locations, the device comprising:

at least two groups of inclined platforms, each platform having an upper article-receiving surface and a leading edge region, wherein each article-receiving surface of the first group is overlapped by a platform of the second group;

the device being operable to reciprocate each of the first group of platforms relative to a corresponding second platform between two positions wherein the leading edge region of each of the first group of platforms is sufficiently near a corresponding edge region of a platform of the second group, to cause an article to be transferred from one article-receiving surface to another.

Preferably, in the two positions, the leading region of each of the first group of platforms is substantially aligned with a corresponding leading edge region of a platform of the second group.

In another of its aspects, the invention involves a device for transferring articles from between two spaced locations, the device comprising:

at least two groups of inclined platforms, each platform having an upper article-receiving surface and a leading edge region, wherein each article-receiving surface of the first group is overlapped by a platform of the second group;

the device being operable to reciprocate each of the first group of platforms relative to a corresponding second platform between two positions, wherein the leading edge region of each of the first group of platforms is aligned with a corresponding leading edge region of a platform of the second group.

Preferably, the device is operable to reciprocate the first group of platforms in unison. Still more preferably, the device is operable to reciprocate the platforms of both the first and second groups between the two positions. Still more preferably, the device is operable to reciprocate the first group of platforms in unison and the second group of platforms in unison and opposite to the first group of platforms.

In another aspect of the present invention, there is provided a device for transferring articles from between two spaced locations, the device comprising:

at least two groups of inclined platforms located between said two spaced locations, wherein the platforms of a first group are nested between the platforms of a second group;

each of said platforms having an upper article-receiving surface and a leading edge region adjacent said upper article-receiving surface, wherein the leading edge region on a platform of said first group travels along the article-receiving surface of a lower platform of said second group;

drive means for driving said first and second groups in a reciprocal motion, wherein said first group of platforms is displaced in an opposite direction to said second group and between an upper limit wherein the edge region of said selected platform is adjacent the edge region of the next lower platform and a lower limit wherein the edge region of said selected platform is adjacent the edge region of the next upper platform, wherein the leading edge region of said selected platform is operable to displace articles along the next lower platform, thereby to transfer articles from one platform to another as said platforms move in said reciprocal motion.

In another aspect of the present invention, there is provided a method for transferring articles from between two spaced locations, the device comprising:

providing at least two groups of inclined platforms located between the two spaced locations, wherein the platforms of a first of the groups are nested between the platforms of another of the groups, providing each of the groups with an upper article-receiving surface and a leading edge region adjacent the upper article-receiving surface, orienting the leading edge region on each platform of the first group to travel along the article-receiving surface of a lower platform of the second group in a reciprocal motion, wherein the first group of platforms is displaced in an opposite manner to the second group, to displace a selected platform in a reciprocal motion between an upper limit wherein the edge region of the selected platform is adjacent the edge region of the next lower platform and a lower limit wherein the edge region of the selected platform is adjacent the edge region of the next upper platform, wherein the leading edge region of the selected platform is operable to displace articles along the next lower platform, thereby to transfer articles from one platform to another as the platforms move in the reciprocal motion.

BRIEF DESCRIPTION OF THE DRAWINGS

Several preferred embodiments of the present invention will now be described, by way of example only, with reference to the appended drawing in which:

FIG. 2 is a sequential schematic view of the device of FIG. 1 in a number of operational positions;

DESCRIPTION OF THE PREFERRED EMBODIMENTS

Figure 1:
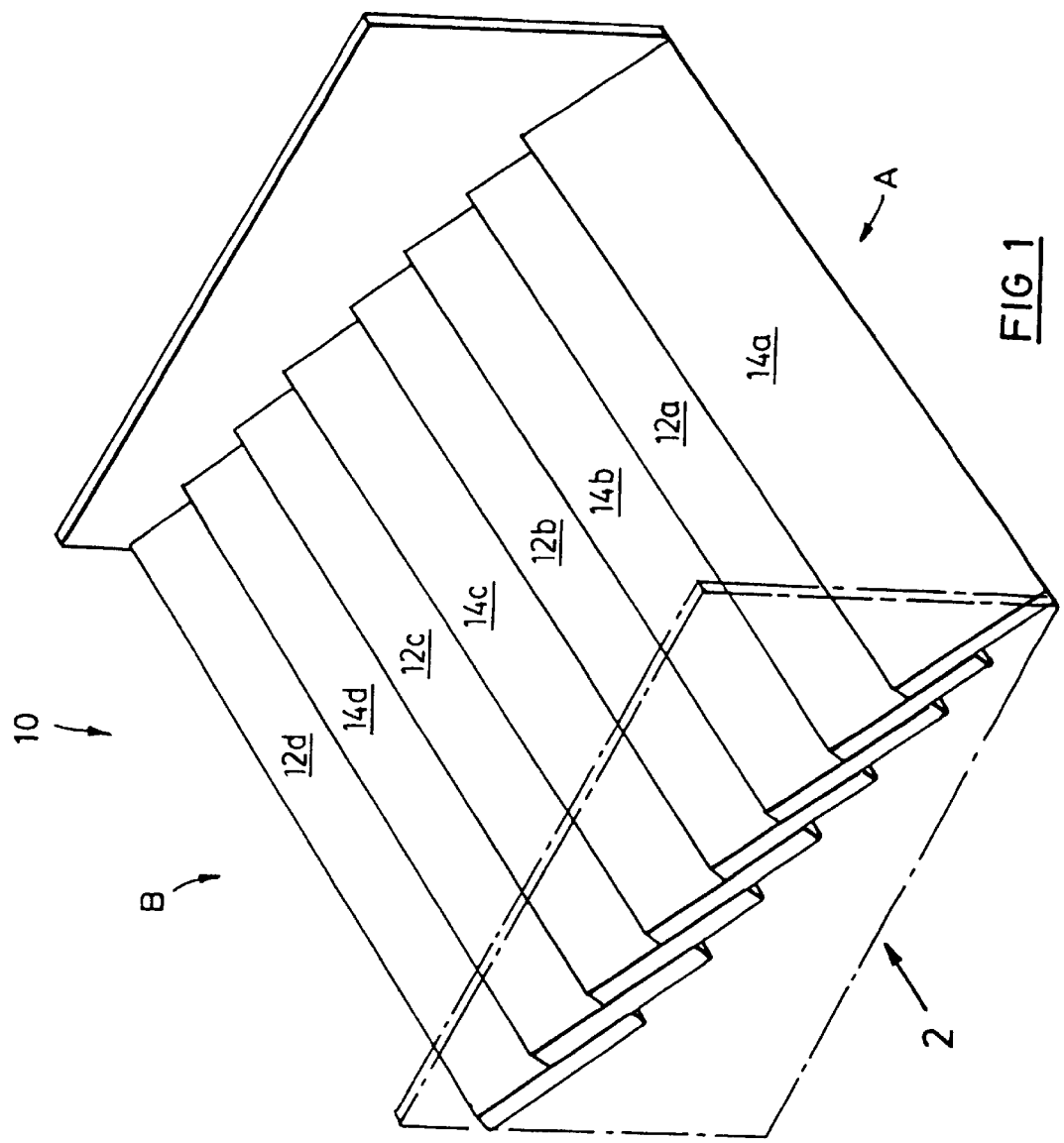
FIG. 1 is a schematic perspective view of an article transfer device.
Figure 1A:
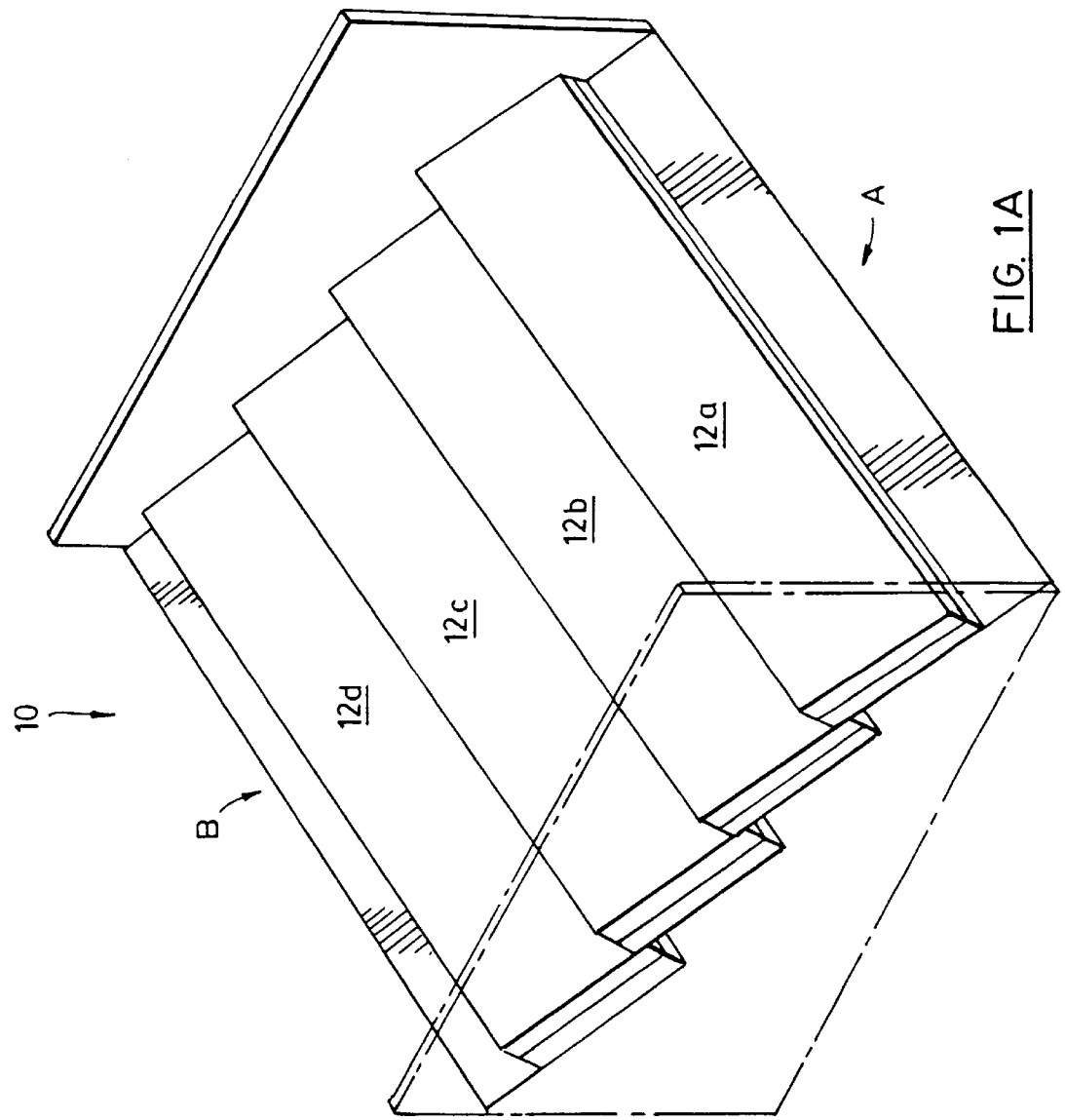
FIG. 1A is a schematic perspective view of the device of FIG. 1 is another operative position.

Referring to the figures, particularly FIGS. 1 and 2, there is provided an article transfer device shown schematically at 10, in this particle case for transferring logs from between two spaced locations, shown at A and B. Location A may, for example, be a conveyor path to deliver logs from an upstream processing station or a delivery station, while location B may, for example, be another conveyor path to deliver logs to a downstream processing station.

The device 10 has two groups of inclined platforms shown at 12a, 12b, 12c, 12d and the second group shown at 14a, 14b, 14c and 14d. It can be seen that the platforms 12 are nested between the platforms 14 between the locations A and B.

Figure 3:
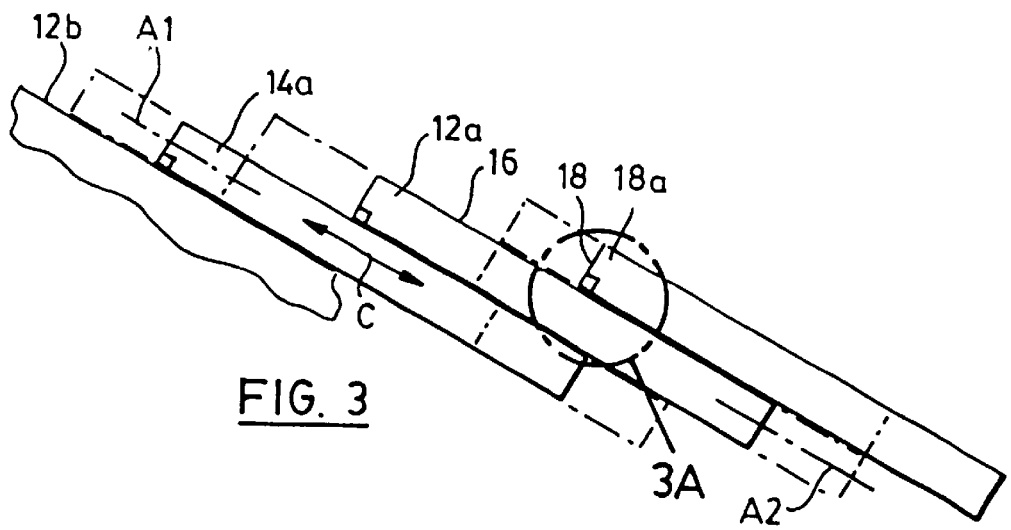
FIG. 3 is a schematic side view of a portion of the device of FIG. 1.
Figure 3A:
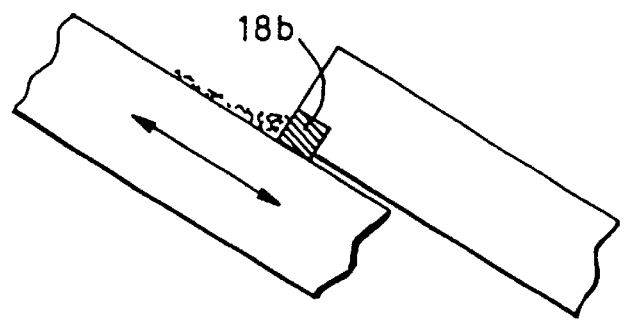
FIG. 3A is a magnified side view taken on circle 3A of FIG. 3.

Referring to FIG. 3, each of the platforms has an upper log-receiving surface 16 and a leading edge region 18 adjacent said upper log-receiving surface. The leading edge region on a platform of the first group travels along the log-receiving surface of a lower platform of the second group in a reciprocal fashion as shown by the arrow 'C' between two limits, a lower limit being shown in dotted lines where the leading edge region, for example of the platform 12a is generally aligned with the leading edge region of the upper platform 14a, and an upper limit shown in chain dashed lines where the leading edge region of the platform 12a is generally aligned with the lower platform 14b. In this case, the platforms 14a and 14b are also traveling in unison between similar upper and lower limits and opposite to the platforms 12a, 12b.

Thus, the device is operable to reciprocate each of the first group of platforms relative to a corresponding second platform between two positions wherein the leading edge region of each of the first group of platforms is sufficiently near a corresponding leading edge region of a platform of the second group, to cause an article to be transferred from one article-receiving surface to another. In this particular case, the upper and lower limits are reached when the leading edge regions of the respective platforms are generally aligned with one another. However, the device may in some cases function to transfer the article from one article-receiving surface to another, without having the leading edge regions generally aligned as in this case. For example, other arrangements may provide the leading edge regions to be within a fraction of an inch or greater to a number of inches. The degree to which the leading edge regions need to be close or aligned will depend on the dimensions of the article being transferred. For example, a relatively large article such as a log, may be successfully transferred in all cases when the leading edge regions are within an inch or so of alignment, whereas a smaller article may need closer alignment of the leading edge regions to achieve successful transfer. Desirably, the alignment of the leading edge regions in this particle case, should allow for substantially all of the log debris and the like to be transferred from the article-receiving surface to another in order to reduce its buildup.

Figure 1B:
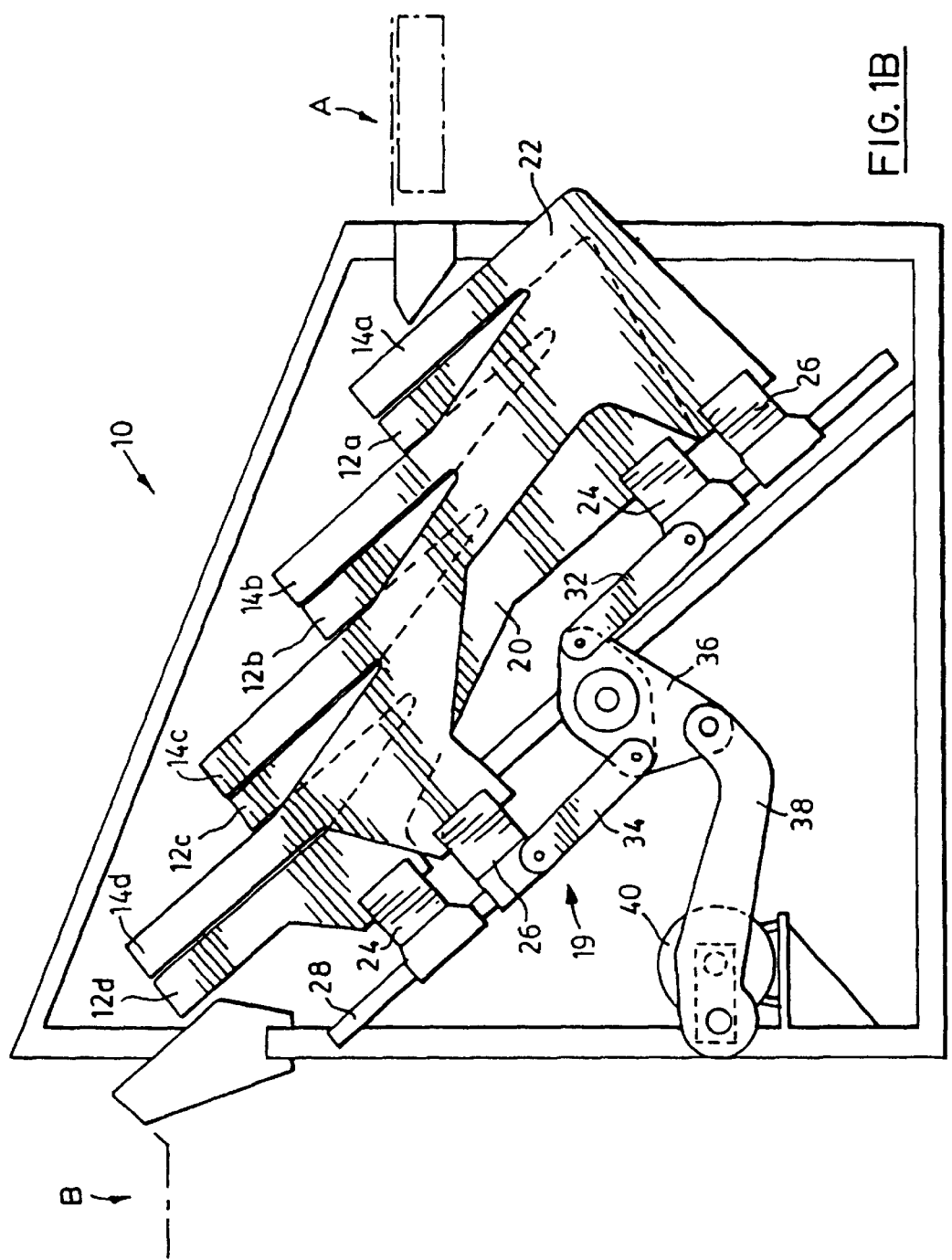
FIG. 1B is a side view of the device of FIG. 1.
Figure 1C:
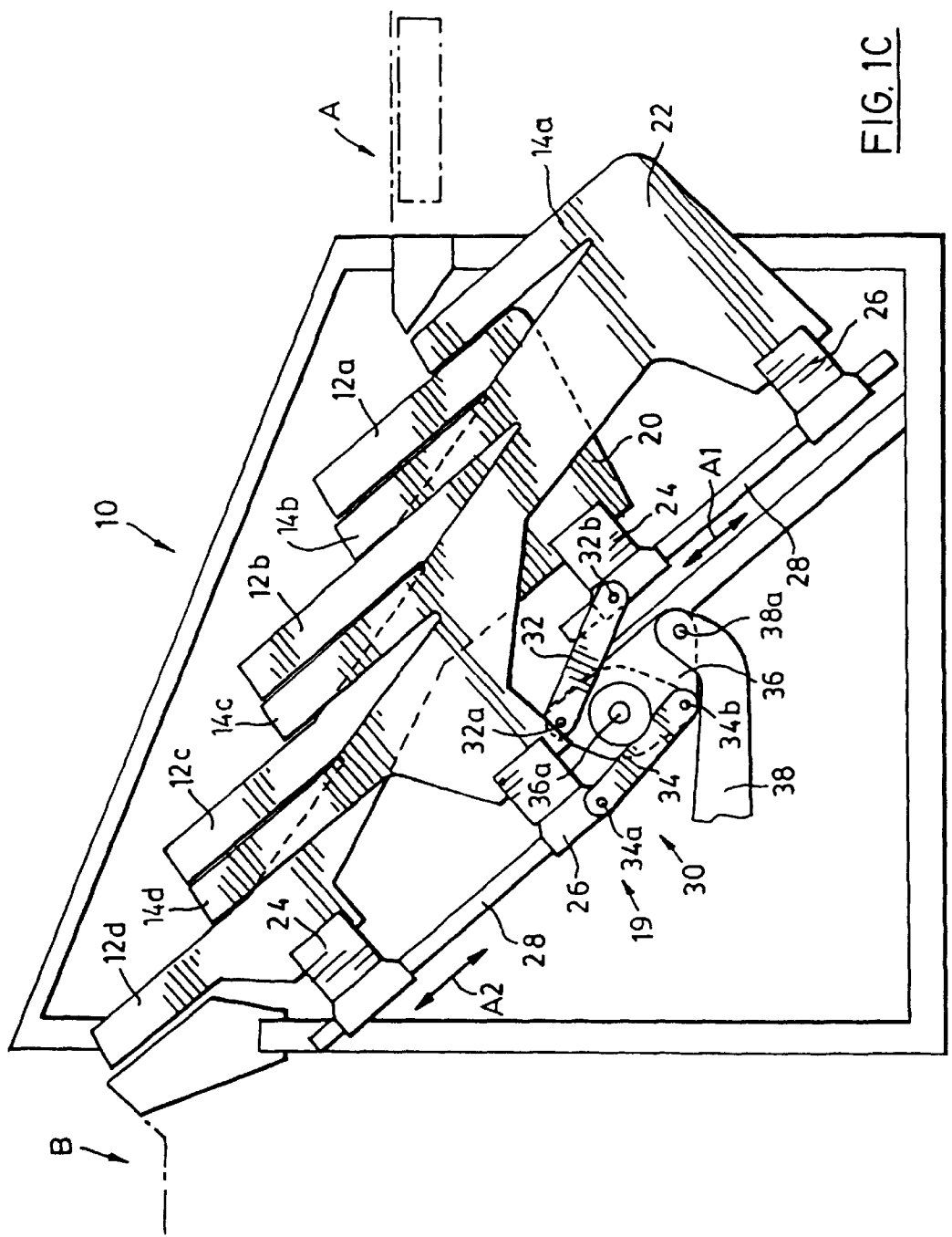
FIG. 1C is a fragmentary side view of the device of FIG. 1.

Referring to FIGS. 1B and 1C, drive means is also provide at 19 for driving the first and second groups in a reciprocal motion along parallel axes as shown at A1 and A2, wherein the first group of platforms is displaced in an opposite manner to the second group. The drive means is operable to displace a selected platform in the above mentioned reciprocal motion between the upper limit. Each of the first group of platforms 12 are mounted on a first drive frame member 20 while each of the second group of platforms 14 are mounted on a second drive frame member 22. Each of the frames 20, 22 are mounted on linear bearing assemblies 24, 26 to travel along inclined tracks 28. A rocker assembly 30 is coupled to respective linear bearing assemblies by way of links 32, 34, which are joined to a central rocker 36, all via pivots 32a, 32b, 34a and 34b. The rocker 36 has a central pivot 36a and a drive link or crank 38 pivoted to the rocker via pivot 38a, wherein the pivots 32a, 34b are substantially equidistant from the central axis, in this case. The drive link 38 is pivoted, at its opposite end, to a drive motor 40. The drive means may also include other aspects of the drive disclosed in the Applicant's above mentioned PCT application.

Thus, as will be described, the leading edge region of the selected platform is operable to displace logs along the next lower platform, thereby to transfer logs from one platform to another as the platforms move in the reciprocal motion.

As can be seen in FIG. 3, each of the leading edge regions includes an end face 18a which is generally perpendicular to the log-receiving surface. In this case, the end face is generally planar. Desirably, the platforms 12 and 14 are sufficiently close to one another that, in addition to transferring logs from one platform to the next, the reciprocating platforms are capable of transferring debris from one platform to the next, thereby making the task of cleaning a less frequent necessity. If desired, the edge face may also be provided with a resilient seal shown at 18b along its lower edge, for example of suitable plastics such as that sold under the trade name TEFLON for establishing a relatively low friction sliding relationship there between.

Figures 8A, 8B:
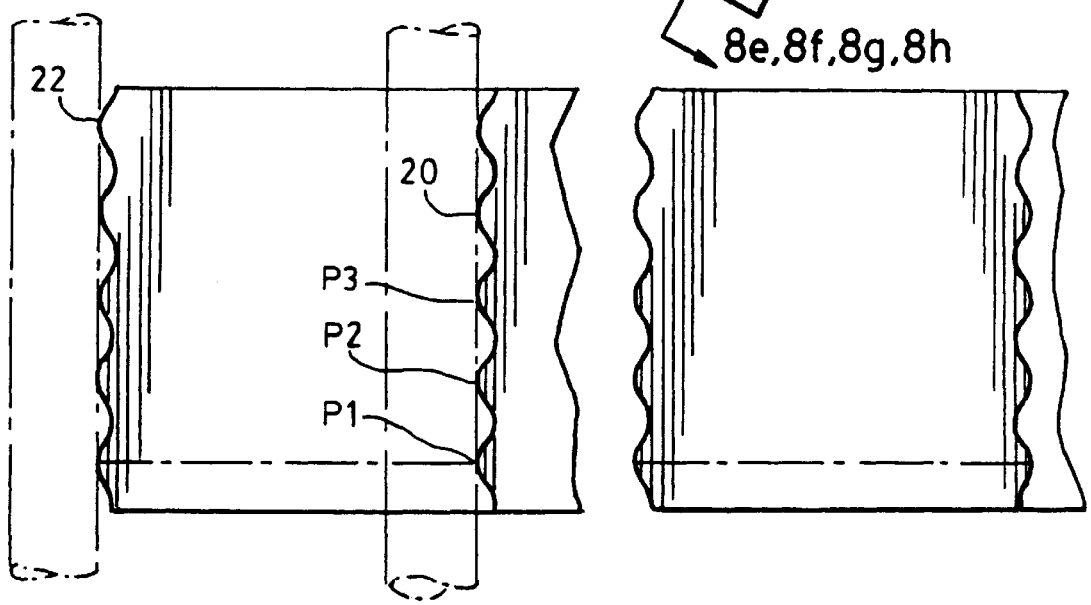
FIGS. 8a to 8d are plan views of alternative article transfer devices according to FIG. 7.
Figures 8C, 8D:
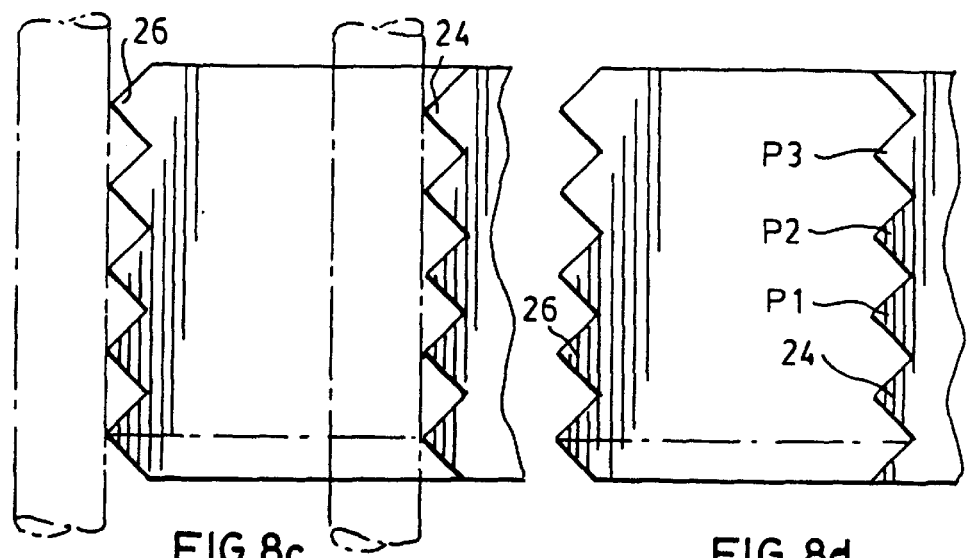
Figure 8E:
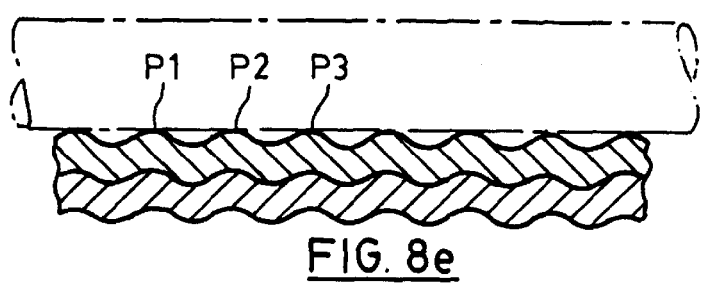
FIGS. 8e to 8h are plan views of alternative article transfer devices according to FIG. 7.
Figure 8F:
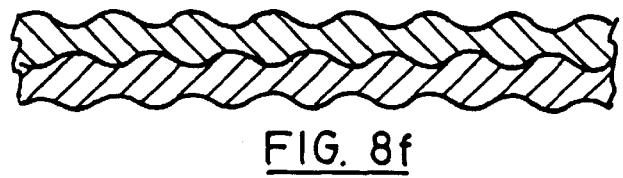
Figure 8G:
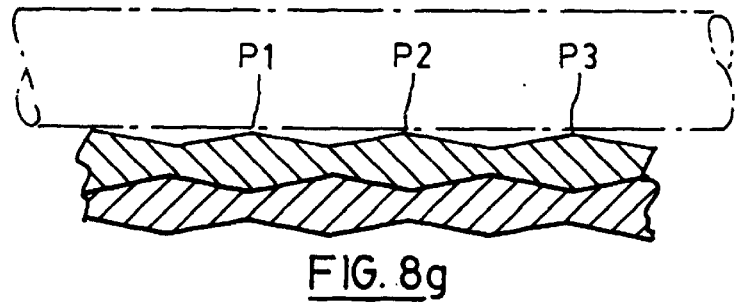
Figure 8H:
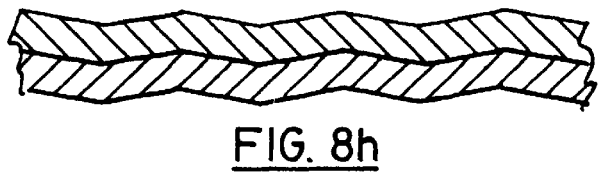

The leading edge region and the platforms themselves can take a number of different forms. In the embodiments of FIGS. 1 and 2, for example, the upper log-receiving surface are generally planar while the leading edge regions are also generally planar. Alternatively, for example, the leading edge region can have an undulating profile, for example sinusoidal in profile, as shown in FIGS. 8a, 8b. In this case the peaks 20 of the leading edge region of one platform may be aligned with the peaks 22 of an adjacent platform as shown in FIG. 8a or laterally offset therefrom as shown in FIG. 8b. Alternatively, the leading edge region may have a saw tooth profile with peaks 24 as shown in FIG. 8c, which are aligned with peaks 26 of the adjacent platform. FIG. 8b shows the same peaks 24, though in this case laterally offset from the saw tooth peaks 26 of an adjacent platform.

Figure 4:
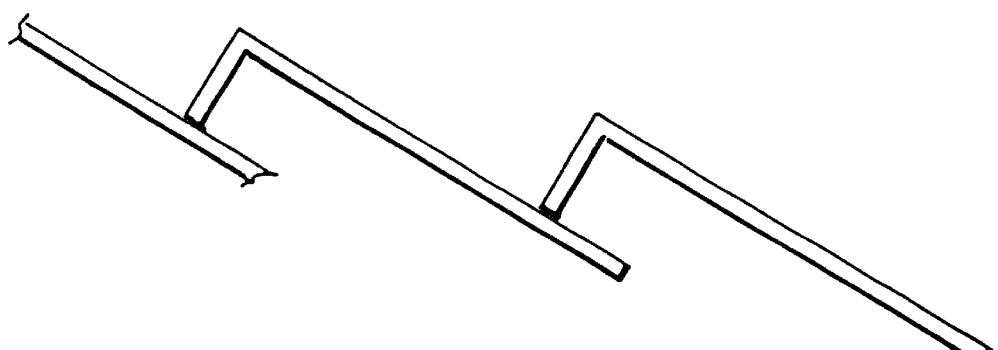
FIG. 4 is a schematic side view of another article transfer device.
Figure 5:
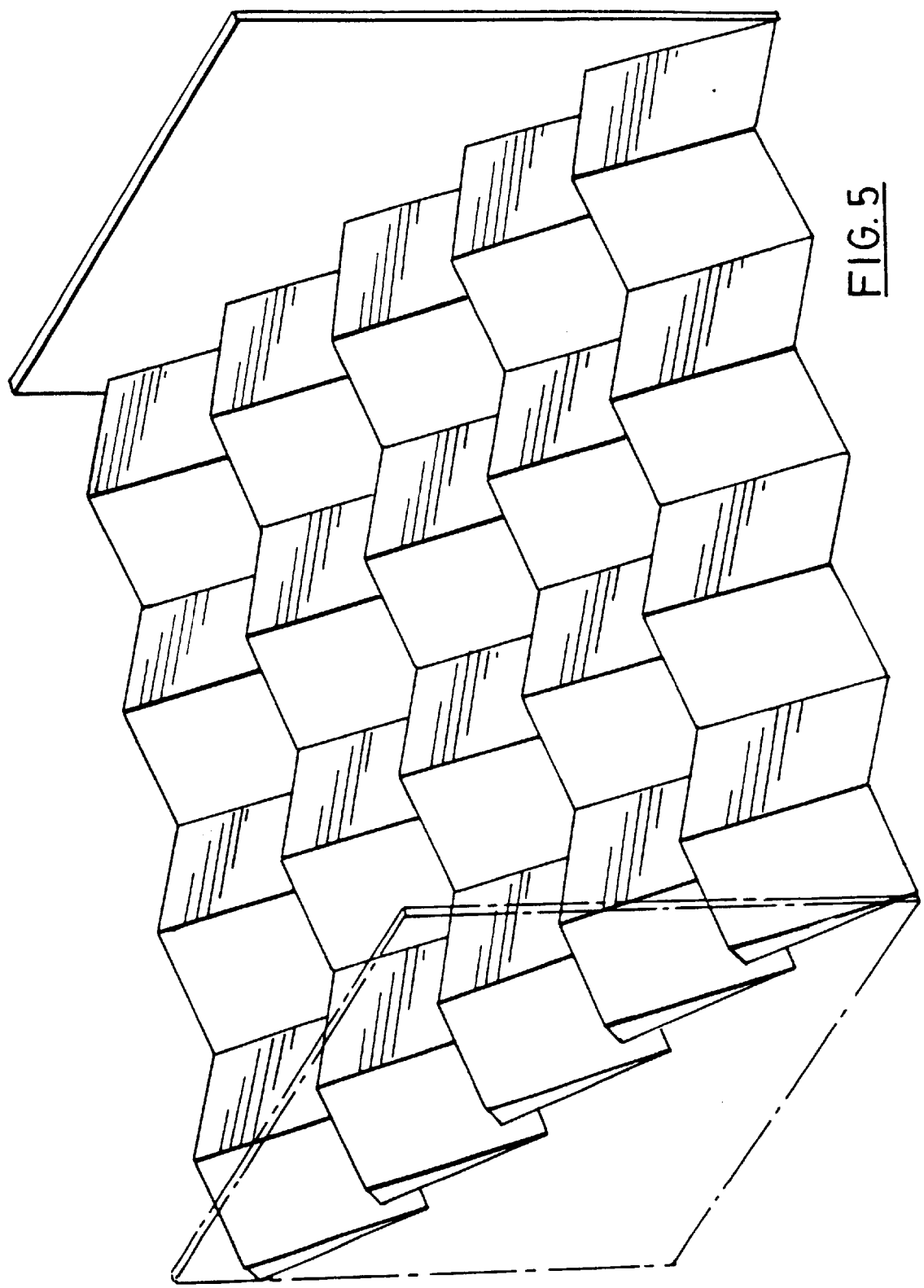
FIG. 5 is a schematic perspective view of still another article transfer device.
Figure 6:
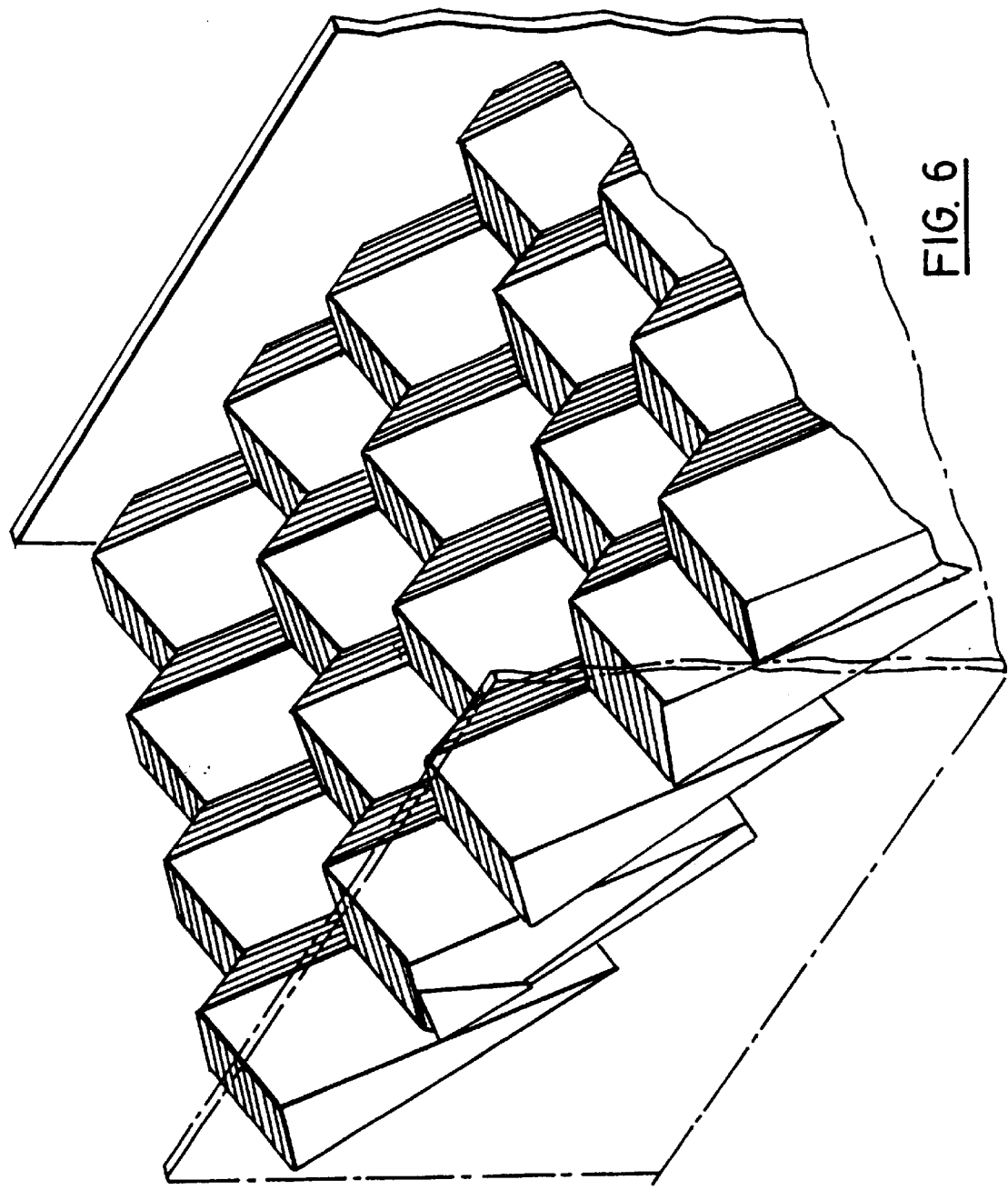
FIG. 6 is a schematic perspective view of still another article transfer device.
Figure 7:
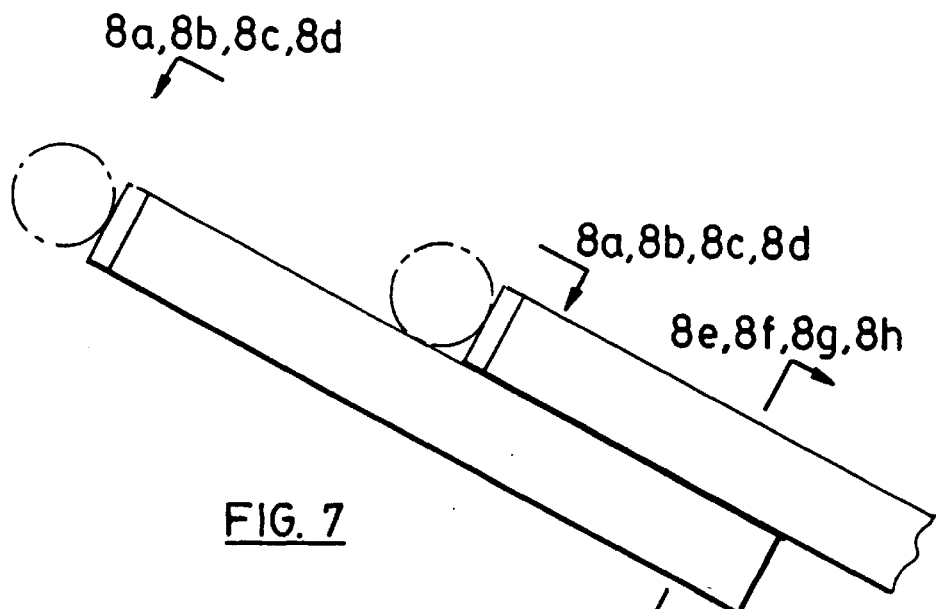
FIG. 7 is a schematic side view of a portion of still another article transfer device.

The upper log-receiving surface of the platform may also be non-planar as shown in FIGS. 5, 6 and 8e to 8h. In this case, the platforms may have an angular cross section or a sinusoidal cross section. These log-receiving surfaces may be beneficial, in some cases, because they provide a number of contact regions P1, P2 and P3 with the log which provides a more controlled engagement of the log with the platform, by reducing the chances that the log will teeter, roll or shift as it travels with the platform, to the extent that it slips off the leading edge region. In addition, the leading edge region, when saw toothed, provides a similar benefit in providing a number of contact regions for improved contact with the log. In one example, the angular log-receiving surface and the saw-tooth profiled leading edge region should provide for improved transfer of both the logs between locations A and B and the log debris. FIG. 6 shows yet another variation having a leading edge region which is angular in plan and a log receiving surface which is angular in cross section. The device of FIG. 4 has platforms which have a platform portion and a leading edge region portion.

The device 10 is used in the following manner. First, the location A is positioned so as to receive logs from an incoming conveyor path for example, while location B is similarly positioned adjacent its corresponding output location, that is adjacent a downstream conveyor path. The drive means is initiated, causing the two sets of platforms to move in their reciprocating motion. As a log arrives on the platform 14a from the location A, as shown in FIG. 2A, it rolls onto the log receiving surface of the first platform 14a and, after the first reciprocating step, finds itself against the leading edge region of the first platform 14a, which in turn displaces the log along the log-receiving surface of the platform 12a upwardly until the leading edge region of platform 12a is aligned with the leading edge region of the platform 14b. Similarly, the platform 14b, reciprocates upwardly (as shown in FIG. 2C) until it reaches its upper aligned position with platform 12b (as shown in FIG. 2D), causing the log to roll onto the platform 14c. This reciprocal movement of the platforms and the consequential transfer of the log from one log-receiving surface to another, continues upwardly toward the exit region B, where the log is then transferred to a downstream conveyor.

In another aspect of the present invention, there is provided a method for transferring logs from between two spaced locations, the device comprising:

providing at least two groups of inclined platforms located between the two spaced locations, wherein the platforms of a first of the groups are nested between the platforms of another of the groups;

providing each of the groups with an upper log-receiving surface and a leading edge region adjacent the upper log-receiving surface, orienting the leading edge region on each platform of the first group to travel along the log-receiving surface of a lower platform of the second group in a reciprocal motion, wherein the first group of platforms is displaced in an opposite manner to the second group, to displace a selected platform in a reciprocal motion between an upper limit wherein the edge region of the selected platform is adjacent the edge region of the next lower platform and a lower limit wherein the edge region of the selected platform is adjacent the edge region of the next upper platform, wherein the leading edge region of the selected platform is operable to displace logs along the next lower platform, thereby to transfer logs from one platform to another as the platforms move in the reciprocal motion.

Thus, it will be seen that the first and second groups are preferably arranged to operate in unison and in opposed fashion. However, there may be situations where it is beneficial to have the first and second groups not operating necessarily in unison. For example, there may be applications where the movement of the first and second groups may be sequential, that is operate only when a log is present. There may also be applications where only the first group of platforms is moving relative to the second group of platforms which is stationary, or vice versa.

While the drive systems discussed herein in some cases use linear bearing assemblies, a range of other suspension systems may alternatively be used, such as those using other bearing assemblies such as roller bearings, as well as a pneumatic or hydraulic assemblies, or the like.

While the devices shown herein have been discussed for use in transferring logs, it will be understood that the devices shown herein may also be, in some cases, used to transfer other articles, such as for example, wood planks, plastic and aluminum rods and other generally elongate articles, from one station to another.

What is claimed is:

1. A device for transferring articles having a length greater than their height and their thickness between two spaced locations, said device comprising:

two groups of inclined platforms, the platforms of the first group being arranged in an alternating relation with the platforms of the second group, each platform having an upper article-receiving surface and a leading edge region, said device being operable to reciprocate the platforms of the first group relative to the platforms of the second group between two positions wherein the leading edge region of the platforms of said first group is no further from the leading edge region of a corresponding platform of the second group than one half of the smaller of the article's height and width so as to cause an article to be transferred from one article-receiving surface to another, said platforms of said first group being mounted on a first drive frame member and said platforms of said second group being mounted on a second drive frame member, said first and second drive frame members each being mounted on bearings; and a drive means disposed beneath said first and second groups of inclined platforms, said drive means comprising a motor driving a crank assembly, said crank assembly causing driving of a rocker assembly, said rocker assembly further comprising a central axis and two pivots spaced therefrom, each of said pivots being coupled with a corresponding one of said drive frame members, wherein said rocker assembly is disposed intermediate said two spaced locations such that a portion of the weight of said two groups of platforms is disposed forwardly of the position of said rocker assembly and the remainder of the weight of said two groups of platforms is disposed rearwardly of the position of said rocker assembly.

2. A device as defined in claim 1, wherein said first drive frame is disposed adjacent said second drive frame.

3. A device as defined in claim 1, wherein said crank assembly comprises a crank and a link, sand crank being operationally connected to said motor through said link.

4. A device as defined in claim 1, wherein when the rocker assembly is driven, said rocker assembly completes a partial rotation about its central axis.

5. A device as defined in claim 1, wherein said rocker assembly is disposed such that its central axis is disposed horizontally and normal to the direction of the motion of said inclined platforms.

6. A device for transferring articles having a length greater than their height and their thickness from a lower location, to an upper location said device comprising:

two groups of inclined platforms, the platforms of the first group being arranged in an alternating relation with the platforms of the second group, each platform having an upper article-receiving surface and a leading edge region, wherein at least some of said upper article receiving surfaces comprise a plurality of fixed projections projecting therefrom, said projections comprising an outermost contact region for contacting articles being transferred between said spaced locations, said contact regions being configured as a narrow edge, and wherein said device being operable to reciprocate the platforms of said first group relative to the platforms of the second group between two positions wherein the leading edge region of each of the platforms of the first group is no further from the leading edge region of a corresponding platform of the second group than one half of the smaller of the article's height and width so as to cause an article to be transferred from one article-receiving surface to another.

7. The device as defined in claim 6, further comprising a drive means disposed beneath said first and second groups of inclined platforms, said drive means comprising a motor driving a crank assembly, said crank assembly causing driving of a rocker assembly, said rocker assembly further comprising a central axis and two pivots spaced therefrom, each of said pivots being coupled with a corresponding one of said groups of inclined platforms.

8. A device as defined in claim 7, wherein said rocker assembly is disposed intermediate said two spaced locations such that a portion of the weight of said two groups of platforms is disposed forwardly of the position of said rocker assembly and the remainder of the weight of said two groups of platforms is disposed rearwardly of the position of said rocker assembly.

9. A device as defined in claim 8, wherein when the rocker assembly is driven, said rocker assembly completes a partial rotation about its central axis.

10. A device as defined in claim 6, wherein each said upper article-receiving surface of each of said platforms comprises a plurality of fixed projections projecting therefrom, said fixed projections comprising an outermost contact region for contacting articles being transferred between said spaced locations, said contact regions being configured as a narrow edge, said fixed projections being configured to have a saw tooth profile.

11. A device as defined in claim 10, wherein said fixed projections of said platforms of said first group are configured and disposed to be complementary with said fixed projections of said platforms of said second group.

12. A device as defined in claim 6, wherein said platforms of said first group are mounted on a first drive frame member and said platforms of said second group are mounted on a second drive frame member, said first and second drive frame members each being mounted on bearings.

13. A device as defined in claim 12, wherein said first drive frame is disposed adjacent said second drive frame.

14. A device for transferring logs between two spaced locations between a lower location and an upper location, said device comprising:

two groups of inclined platforms, the platforms of the first group being arranged in an alternating relation with the platforms of the second group, each platform having an upper log-receiving surface and a leading edge region, wherein at least some of said leading edge regions comprise a plurality of projections projecting therefrom, said projections comprising an outermost contact region for contacting logs being transferred between said lower location and upper location, said contact regions being configured as a narrow edge, and said device being operable to reciprocate the platforms of said first group relative to the platforms of the second group between two positions wherein the leading edge region of each of the platforms of the first group is no further from the leading edge region of a corresponding platform of the second group than the radius of the smallest log to be transferred so as to cause each log to be transferred from one log-receiving surface to another.

15. The device as defined in claim 14, further comprising a drive means disposed beneath said first and second groups of inclined platforms, said drive means comprising a motor driving a crank assembly, said crank assembly causing driving of a rocker assembly, said rocker assembly further comprising a central axis and two pivots spaced therefrom, each of said pivots being coupled with a corresponding one of said group of inclined platforms.

16. The device as defined in claim 15, wherein said rocker assembly is disposed intermediate said two spaced locations such that a portion of the weight of said two groups of platforms is disposed forwardly of the position of said rocker assembly and the remainder of the weight of said two groups of platforms is disposed rearwardly of the position of said rocker assembly.

17. A device as defined in claim 14, wherein each said leading edge region of each of said platforms comprises a plurality of projections projecting therefrom, said projections comprising an outermost contact region for contacting the logs being transferred between said lower location and said upper location, said contact regions being configured as a narrow edge, said projections being configured to have a saw tooth profile.

18. A device for transferring logs from a lower location to an upper location, said device comprising:

two groups of inclined platforms, the platforms of the first group being arranged in an alternating relation with the platforms of the second group, each platform having an upper log-receiving surface and a leading edge region, wherein at least some of said upper log-receiving surfaces comprise a plurality of fixed projections projecting therefrom, said projections comprising an outermost contact region for contacting logs being transferred between said lower and upper locations, said contact regions being configured as a narrow edge, and wherein said device being operable to reciprocate the platforms of said first group relative to the platforms of the second group between two positions wherein the leading edge region of each of the platforms of the first group is no further from the leading edge region of a corresponding platform of the second group than the radius of the smallest log to be transferred so as to cause each log to be transferred from one log-receiving surface to another; and drive means disposed beneath said first and second groups of inclined platforms, said drive means comprising a motor driving a crank assembly, said crank assembly causing driving of a rocker assembly, said rocker assembly further comprising a central axis and two pivots spaced therefrom, each of said pivots being coupled with a corresponding one of said drive frame members, and wherein said rocker assembly is disposed intermediate said two spaced locations such that the weight of said first group of platforms is transferred to said first pivot causing a first rotational force about said central axis, and such that the weight of said second set of platforms is transferred to said second pivot causing a second rotational force about said central axis in the opposite direction of said first moment.

19. The device as defined in claim 18, wherein when the device is at rest, said first rotational force is substantially equal to said second rotational force.

\* \* \* \* \*